(12) United States Patent
Wakahara

(10) Patent No.: US 6,661,478 B1
(45) Date of Patent: Dec. 9, 2003

(54) CONTROL APPARATUS

(75) Inventor: Hiroshi Wakahara, Ikoma (JP)

(73) Assignee: Matsushita Electric Industrial Co., Ltd., Osaka-fu (JP)

(*) Notice: Subject to any disclaimer, the term of this patent is extended or adjusted under 35 U.S.C. 154(b) by 0 days.

(21) Appl. No.: 09/558,666

(22) Filed: Apr. 26, 2000

(30) Foreign Application Priority Data

Apr. 27, 1999 (JP) .......................................... 11-119567

(51) Int. Cl.⁷ .............................................. G02F 1/1333
(52) U.S. Cl. ........................ 349/58; 345/173; 345/175; 349/23
(58) Field of Search .................. 349/58, 23; 345/173, 345/174, 175, 176, 177, 178

(56) References Cited

U.S. PATENT DOCUMENTS

| | | | | |
|---|---|---|---|---|
| 5,285,298 A | * | 2/1994 | Kaneko et al. ............... 349/20 |
| 5,414,413 A | * | 5/1995 | Tamaru et al. .............. 345/175 |
| 5,530,456 A | * | 6/1996 | Kokubo ....................... 345/175 |
| 6,259,491 B1 | * | 7/2001 | Ekedahl et al. ................ 349/23 |
| 6,366,276 B1 | * | 4/2002 | Kunimatsu et al. ......... 345/175 |
| 6,480,187 B1 | * | 11/2002 | Sano et al. .................. 345/175 |
| 6,492,633 B2 | * | 12/2002 | Nakazawa et al. .......... 250/221 |

* cited by examiner

Primary Examiner—Toan Ton
Assistant Examiner—David Chung

(57) ABSTRACT

A control apparatus is provided which is imparted with a reliable waterproofness against liquid spilt thereon to prevent a short circuit accident and which matches various armrests of different colors in terms of color. At least a cabinet face plate 6 forming part of an operating section of a cabinet 1 is a light-transmitting plate which covers all the other components of the operating section entirely and tightly. An optical contact-detecting unit such as a reflection-type infrared photo-coupler 9 is located inside of the cabinet face plate 6 to detect an contacting operation through the cabinet face plate 6. A liquid crystal panel 2 may be disposed inside of the cabinet face plate 6 for displaying an operational indication.

6 Claims, 5 Drawing Sheets

CONTROL APPARATUS

BACKGROUND OF THE INVENTION

The present invention generally relates to a control apparatus mounted on an armrest of a seat in a passenger plane, and more particularly to the structure of an operating section located on top of such an apparatus.

As shown in FIG. 3, a common passenger plane is equipped with seats each having an armrest A fitted with a control apparatus 20. The passenger on each seat is capable of listening to his or her favorite music or the sound of a picture selectively by operating the control apparatus 20 with a finger.

This control apparatus 20 has an outward appearance as shown in FIG. 4 and is constructed into a box-shaped unit having a cabinet 21 of resin. On top of the control apparatus 20 an operating section is situated to be manipulated by a passenger's finger. The operating section is provided with operational indications 22. In FIG. 4, reference numeral 23 designates a cable connected to the outside.

When the control apparatus 20 is to be mounted on the armrest A, consideration is usually given to harmonization of the control apparatus 20 with the armrest A in terms of design. For example, the color of the cabinet 21 is selected to be identical with or to match that of the armrest A so as to avoid incongruity in color between the armrest A and the cabinet 21 to be exposed thereon.

The operating section of prior art control apparatus 20 of this type has a structure shown in FIG. 5 including a face plate 24 forming part of the cabinet 21, a switch sheet 25, and a circuit board 26.

The face plate 24 defines a plurality of throughholes 27 in each of which a switch piece 28 is retractably fitted. The switch sheet 25 is fitted with the operational indications 22 and covers the whole outer side of the face plate 24 including the switch pieces 28. The circuit board 26 has a plurality switches 29 each located to face a respective switch piece 28, and a circuit (not shown) for processing signals inputted through these switches 29.

When a passenger depresses a desired indication on the switch sheet 25 of the control apparatus 20 thus constructed with a finger, the corresponding switch piece 28 located inside of the depressed portion protrudes inwardly to depress the corresponding switch 29, thereby closing the contact of the switch 29. In this way, an operation signal corresponding to the operation performed by the passenger is outputted from the control apparatus 20.

Since passengers of a plane usually eat and drink at their own seats, water or drink spilt on the armrest A of a seat often wets the exposed operating section of the control apparatus 20.

The operating section of the prior art control apparatus 20 has openings or clearances such as the through-holes 27 as described above and hence is not sufficiently closed against liquid. For this reason, such water or drink spilt on the control apparatus 20 may cause the switch sheet 25 to be peeled off or may penetrate into the apparatus 20 thereby giving rise to any accident such as a short circuit.

Additionally, since the color of the cabinet 21 of the prior art control apparatus 20 is required to match that of the armrest A in terms of design, the manufacturer has to prepare various control apparatus with cabinets 21 in different colors, thus resulting in the problem of the increased cost as a whole.

The present invention is made in view of the foregoing problems of the prior art apparatus, and it is, therefore, an object of the present invention to provide a control apparatus which is imparted with a reliable waterproofness against liquid spilt thereon to prevent any possible accident such as a short circuit and which is capable of being mounted on armrests of different colors without incongruity in color though it offers limited color models thereby reducing the manufacturing cost as a whole.

BRIEF SUMMARY OF THE INVENTION

To attain the above object, the present invention provides a control apparatus comprising a cabinet on a face of which an operating section is formed which is operable by contact, characterized in that at least a cabinet face plate forming part of said operating section comprises a light-transmitting plate covering all the other components of said operating section tightly and entirely and an optical contact-detecting unit is located inside of said face plate of said cabinet.

The control apparatus according to claim 1 of the present invention comprises a cabinet on a face of which an operating section is formed which is operable by contact wherein at least a cabinet face plate forming part of said operating section comprises a light-transmitting plate covering all the other components of said operating section tightly and entirely and an optical contact-detecting unit is located inside of said face plate of said cabinet.

With this construction, the operating side of the cabinet is tightly covered with the cabinet face plate reliably protecting the inside of the apparatus against liquid that may happen to be spilt on the apparatus with its waterproofness. When the user touches the cabinet face plate with a finger, the light passing through the cabinet face-plate is reflected by the finger touching the cabinet face plate and the reflected light is detected by the optical contact-detecting unit, whereby the contact of the user's finger with the cabinet face plate is detected.

Furthermore, when the control apparatus is mounted on an armrest of a seat, the cabinet face plate exposed on the upper side of the armrest is transparent or translucent and hence is inconspicuous relative to the armrest in terms of color. Thus, the control apparatus does not exhibit any incongruity with an armrest of any color.

In the control apparatus according to claim 1, the cabinet face plate may be translucent and the optical contact-detecting unit may be located inside of the cabinet face plate immediately facing the cabinet face plate without any intervening member. However, the control apparatus according to claim 2 of the present invention further comprises a liquid crystal panel disposed inside of the cabinet face plate for displaying an operational indication.

With the feature of the control apparatus according to claim 1, an indication displayed by the liquid crystal panel can be seen through the cabinet face plate from the outside and, hence, there is no need to print any operational indication on the cabinet face plate or affix any printed sheet thereon. Additionally, since the liquid crystal panel enables any operational indication to be changed easily and hence copes with any change in operation.

In the control apparatus according to claim 1, the liquid crystal panel may be of a reflection type which reflects light from the outside to make the indications thereof visible. However, the control apparatus according to claim 2 further comprises a lighting unit disposed inside of the liquid crystal panel.

With the feature of the control apparatus according to claim 2, the liquid crystal panel displays indications by utilizing light from the lighting unit disposed inside thereof and, hence, such indications are visible even if the environment is dark.

In the control apparatus according to claim 2, the lighting unit may comprise an illumination plate for receiving light from a light emitting body within the thickness thereof as claimed in claim 3. With this feature, the inside of the liquid crystal panel is entirely illuminated at a substantially even luminance thereby ensuring clearer display of indications. Furthermore, since most of the back-light of the liquid crystal panel passes through the liquid crystal panel and the back-light is scarcely directed to the optical contact-detecting unit, the back-light does not interfere with the detecting operation of the optical contact-detecting unit.

In the control apparatus according to claim 4, a reflection-type photo-coupler comprising an infrared light emitting device and an light receiving device is adopted as the optical contact-detecting unit. This feature enables a finger operation of the user to be detected accurately without any interference which may otherwise be caused by light from the outside or back-light of the liquid crystal panel.

The control apparatus according to claim 5 comprises a plurality of optical contact-detecting units which perform detection at different timing from each other. This feature avoids an inconvenience such as a detection error due to mutual interference between the optical contact-detecting units.

In the control apparatus according to claim 6, the cabinet is a tight unitary member. With this feature, the inside of the control apparatus is reliably protected against liquid that may happen to be spilt on the control apparatus by virtue of its firm waterproofness.

While the novel features of the present invention are clearly described in the appended claims, the present invention will be better understood and appreciated in terms of its constructions and details as well as its objects and features from the reading of the following detailed description with reference to the drawings.

Figure 1:
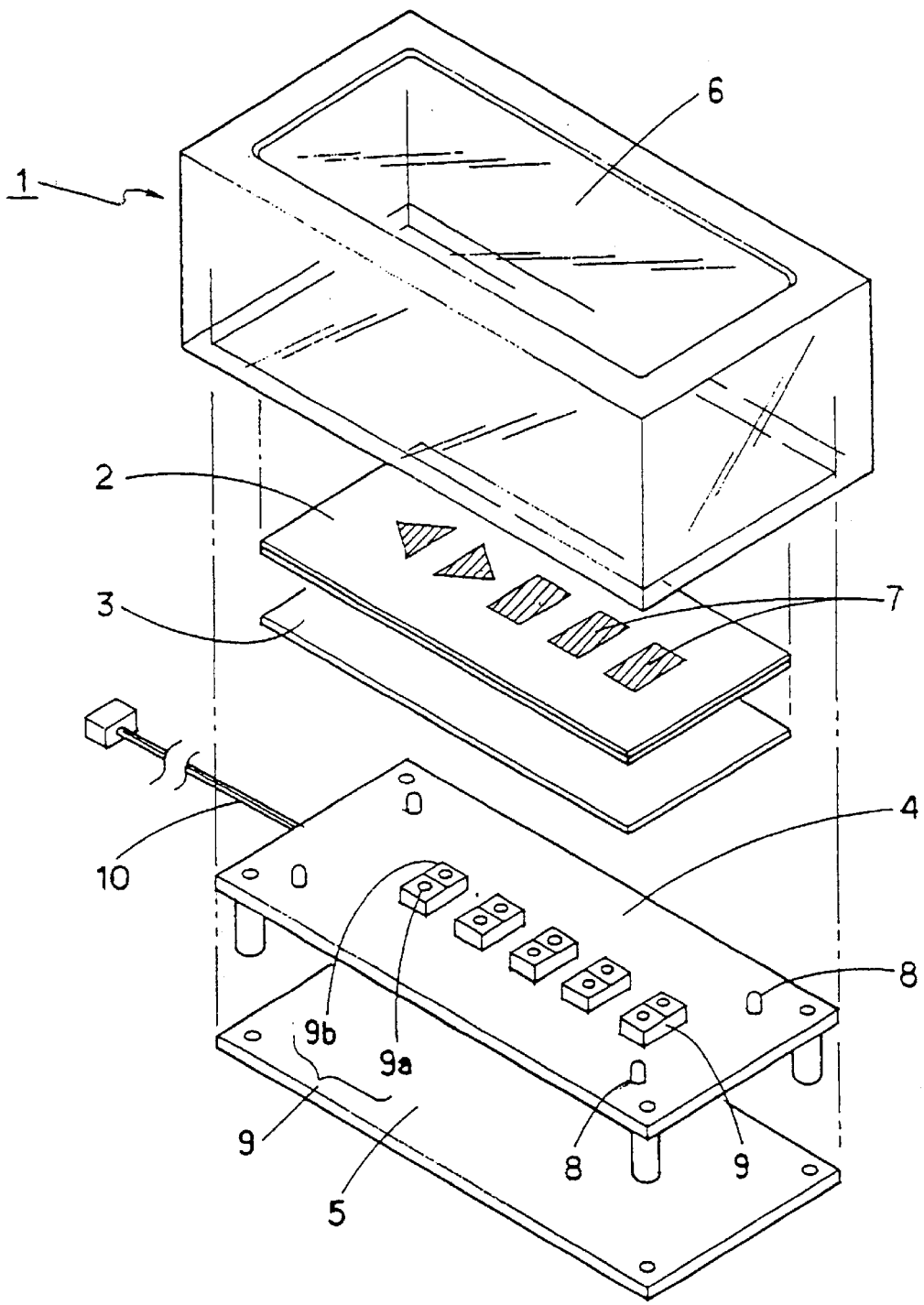
FIG. 1 is an exploded perspective view showing the overall structure of a control apparatus embodying the present invention.

It should be noted that the drawings, partially or wholly, are made by schematic representation for the purpose of illustration and the elements shown therein do not necessarily reflect the relative sizes or positions of the actual elements.

DETAILED DESCRIPTION OF THE INVENTION

Now referring to the drawings, preferred embodiments of the invention are described below.

Figure 2:
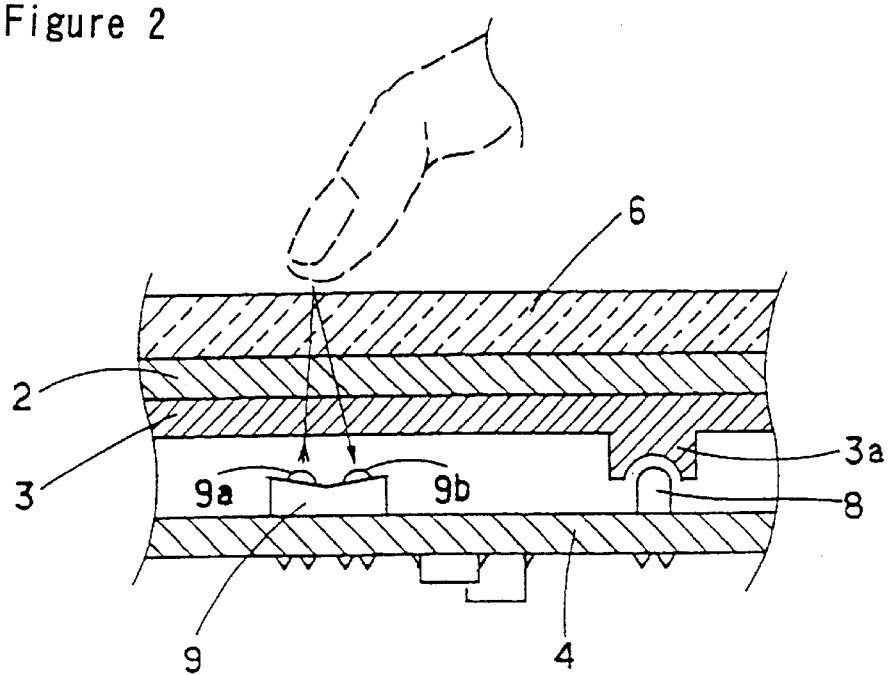
FIG. 2 is an enlarged sectional view showing an operating section forming part of the control apparatus shown in FIG. 1.
Figure 3:
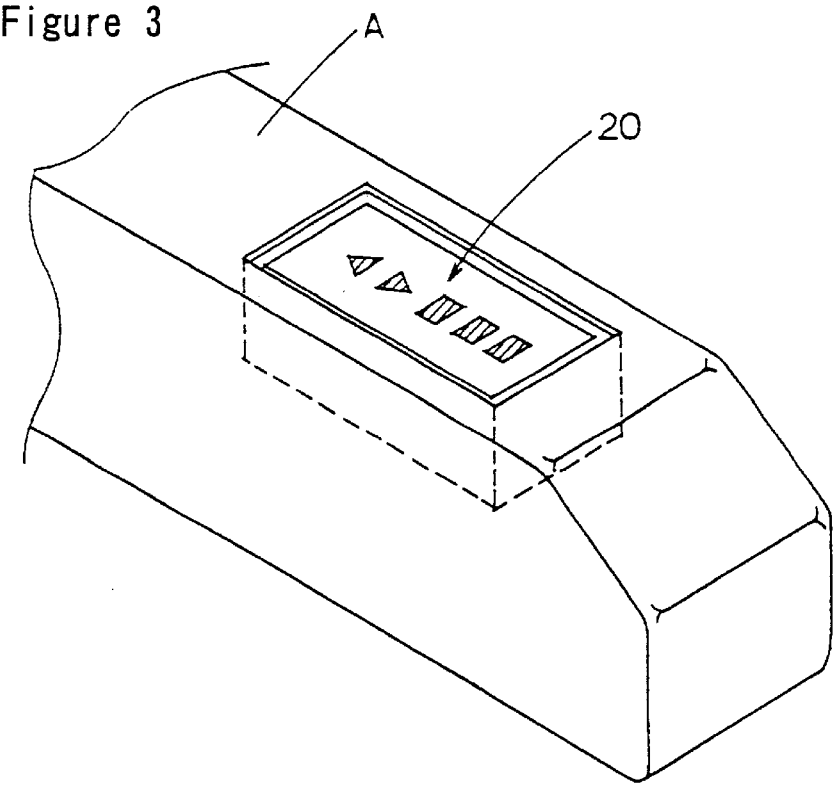
FIG. 3 is a perspective view of the control apparatus as mounted on an armrest.
Figure 4:
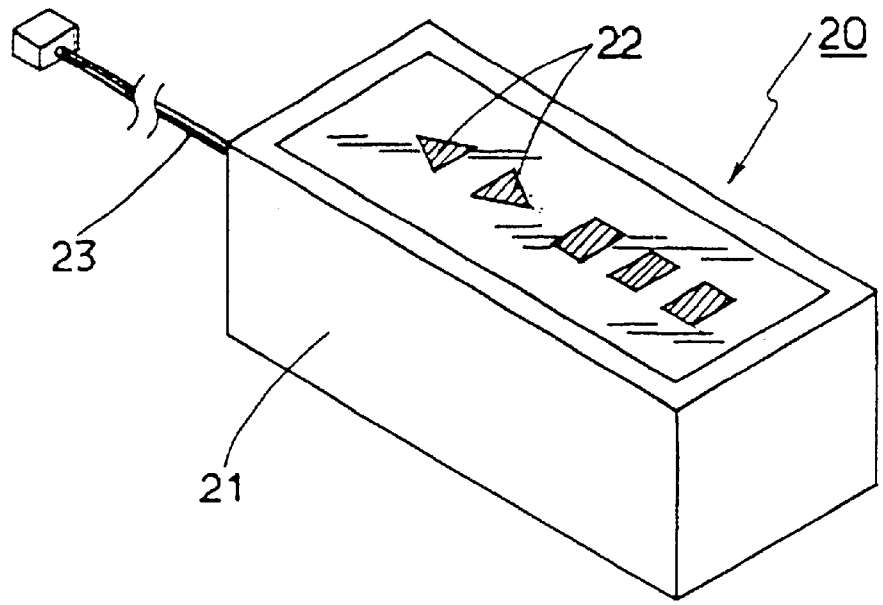
FIG. 4 is a perspective view illustrating an outward appearance of a prior art control apparatus.

FIGS. 1 and 2 illustrate an embodiment of the present invention. FIG. 1 is an exploded perspective view showing the overall structure of a control apparatus according to the embodiment, and FIG. 2 is an enlarged sectional view showing an operating section forming part of the control apparatus shown in FIG. 1.

As shown in FIG. 1, the control apparatus of the present invention comprises a cabinet 1, a liquid crystal panel 2, an illumination plate 3, a circuit board 4, and a base plate 5.

The cabinet 1 is in the form of a box with an open side (the lower side in FIG. 1) situated opposite to the operating side and is entirely formed of a transparent resin. As shown, a cabinet face plate 6 forming part of an operating section located on top of the apparatus is a transparent plate covering all the other components of the operating section tightly and entirely.

The liquid crystal panel 2 displays operational indications which are seen through said cabinet face plate 6 and is disposed inside thereof and parallel with the cabinet face plate 6. Reference numeral 7 designates operational indications on the liquid crystal panel 2.

In the specification and claims, the term "inside" is used to represent a location nearer the circuit board 4, while the term "outside" is used to represent a location away from the circuit board 4.

The liquid crystal panel 2 may be of the reflection type which reflects light from the outside to display indications. In this embodiment, the liquid crystal panel 2 is of the transmitting type utilizing an illumination plate 3 as a back-lighting unit disposed inside of the panel 2.

The illumination plate 3 is, for example, formed of a transparent resin plate in which fine particles for scattering light are dispersed. The illumination plate 3 has a light-receiving portion 3a projecting from a portion of the illumination plate 3 for allowing light from a light emitting diode 8 to go into the thickness of the illumination plate 3 therethrough. Light incident on the illumination plate 3 is then scattered by the fine particles, whereby the illumination plate 3 is entirely illuminated. Such an illumination plate 3 is a mere example, and the illumination plate 3 of any construction is usable so long as it can be illuminated entirely.

On the circuit board 4 are mounted the light emitting diode 8 for illuminating the illumination plate 3, and a plurality of reflection-type photo-couplers 9 each comprising an infrared light emitting diode 9a and an light receiving diode 9b which are formed into contact-detecting units for optically detecting a contacting operation-of the user. The photo-couplers 9 are located in the positions corresponding to the operational indications 7 displayed by the liquid crystal panel 2 respectively and detect a user's finger touching a portion of the cabinet face plate 6 that corresponds to one of the operational indications 7 by sensing infrared ray through the cabinet face plate 6, the liquid crystal panel 2 and the like. Although not shown, other components mounted on the circuit board 4 include a drive circuit for the photo-couplers 9 and a signal processing circuit for processing signals fed from the photo-couplers 9.

In FIG. 1, reference numeral 10 designates a cable connected to the outside. The plurality of photo-couplers 9 are driven at different timing from each other to perform detection.

The base plate 5 is attached to the open side of the cabinet 1 so as to close the cabinet 1 tightly.

As described above, the control apparatus comprises the cabinet face plate 6, the liquid crystal panel 2 and the illumination plate 3 which are stacked in this order counted from the outside, and the photo-couplers 9 are disposed inside of this stacked structure. Since the front face of the control apparatus is entirely and tightly covered with the cabinet face plate 6 free of any opening, the control apparatus is firmly waterproof against water or drink which may be spilt thereon, whereby a short circuit accident due to penetration of such water or drink into the apparatus will not occur.

Preferably, the top and four lateral sides of the cabinet 1 shown in FIG. 1 are formed into a unitary member covering the control apparatus tightly and entirely. An end portion of such a control apparatus is shown in an enlarged sectional view in FIG. 7.

Figure 5:
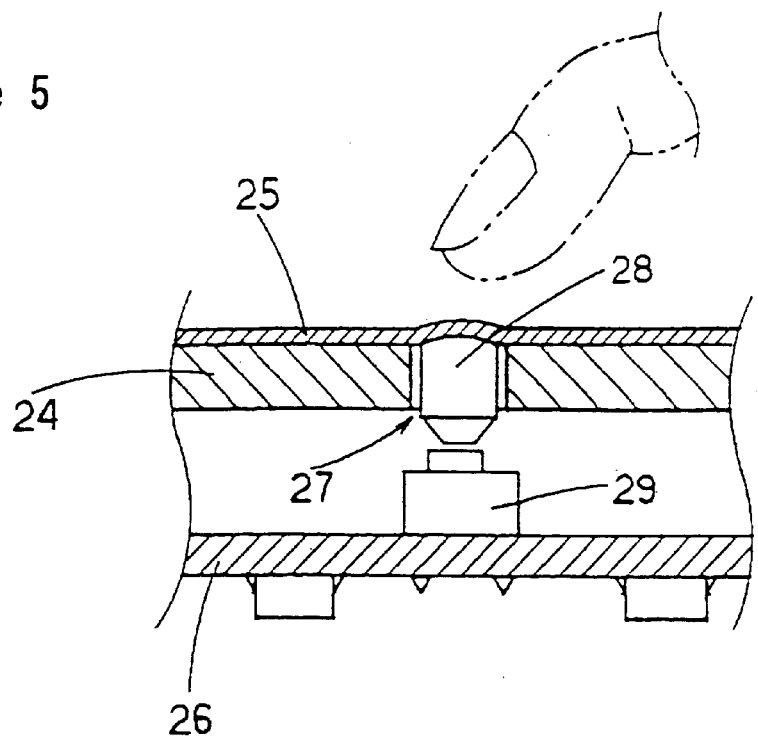
FIG. 5 is, an enlarged sectional view showing an operating section of the prior art control apparatus shown in FIG. 4.
Figure 6:
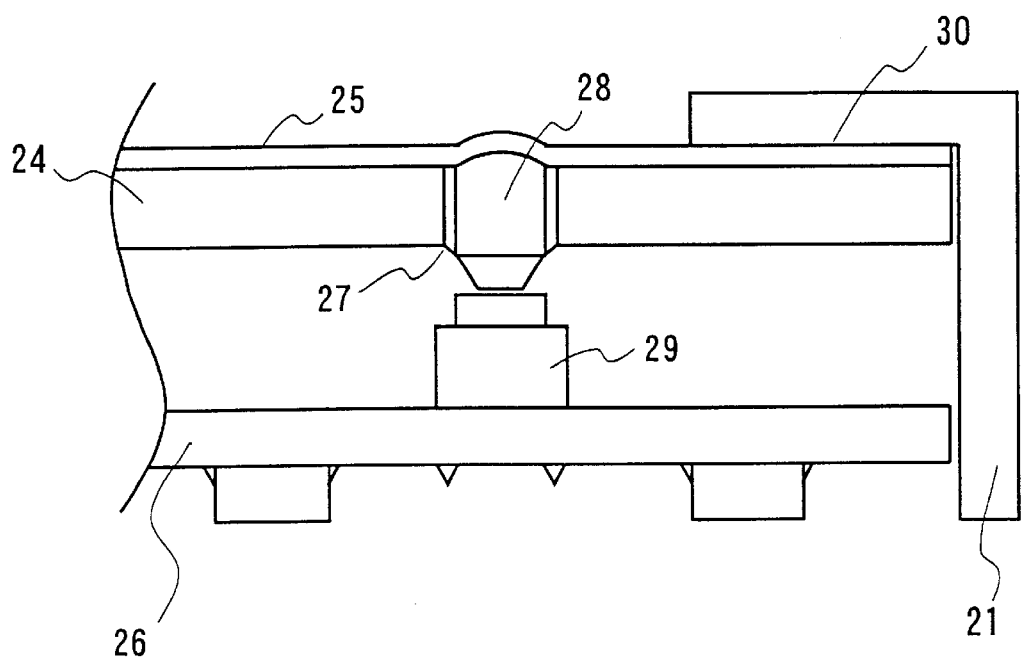
FIG. 6 is an enlarged sectional view showing an end portion of the prior art control apparatus.

An end portion of the prior art control apparatus shown in FIG. 5 is shown in an enlarged sectional view in FIG. 6. If there is not any opening in the switch sheet 25 of the prior art apparatus, water spilt on the control apparatus does not leak into the inside through a through-hole 27.

In the prior art control apparatus, as shown in FIG. 6, the switch sheet 25 and the face plate are in intimate contact with a side wall of the cabinet 21 at a corner. However, the long use of the prior art control apparatus causes a clearance to be formed in the portion 30 between the switch sheet 25 and the side wall of the cabinet 21 through which spilt water may leak into the inside of the apparatus.

Figure 7:
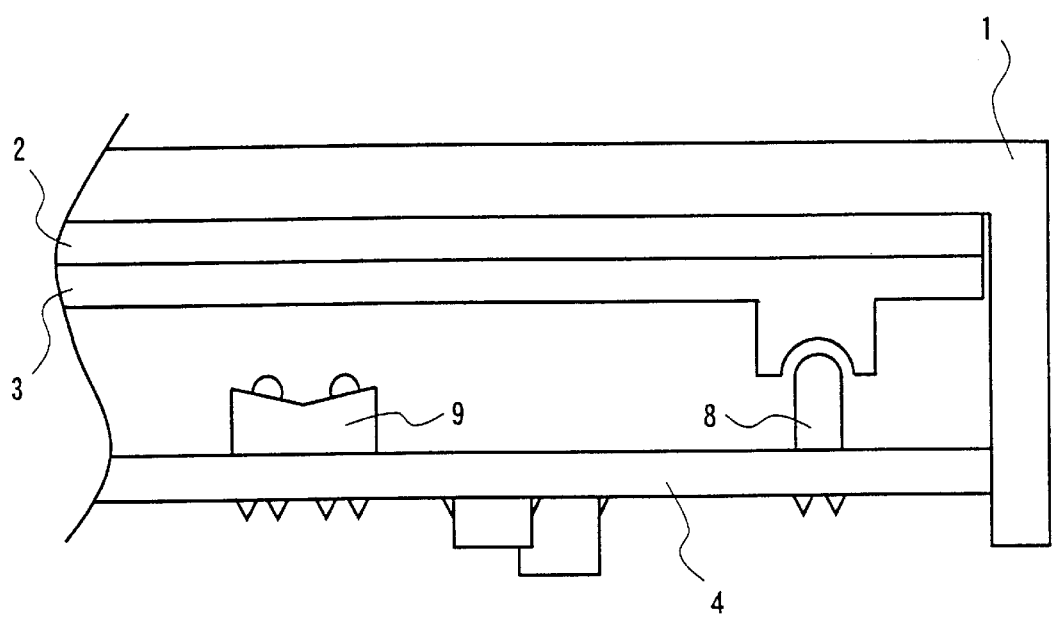
FIG. 7 is, an enlarged sectional view showing an end portion of the control apparatus embodying the present invention.

In contrast, the top (operating section) and four lateral sides of the cabinet 1 of the control apparatus according to the present invention shown in FIG. 7 are formed into a unitary member which is free from any clearance or opening through which water can penetrate into the apparatus. Thus, it can get rid of the accident that such spilt water enters the apparatus.

For the reason of cost, in most cases the cabinet 1 shown in FIG. 7 is entirely made of a single material. Since the cabinet 1 which has the function to keep the outward form of the control apparatus is rigid, the top wall of the cabinet 1 shown in FIG. 7 is also rigid, which does not permit the use of push switches with mechanical stroke as an operation-detecting unit.

With the prior art control apparatus shown in FIG. 6, an instruction-is inputted by depressing a desired push switch 29 from above the soft switch sheet 25 and through the switch piece 27.

On the other hand, the control apparatus of the present invention shown in FIG. 7 employs the reflection-type photo-couplers 9 as the operation-detecting unit instead of the push switches.

Since the reflection-type photo-coupler does not require a depressing stroke for operation, it can be used with the operating section (top side of the control apparatus) formed of a rigid material. Where the operating section of the prior art control apparatus is made rigid, it is necessary for such a prior art apparatus to use an operation-detecting unit for detecting, for example, a change in electrostatic capacity due to access of a user's finger. Such an operating-detecting unit requires a microcomputer or the like, leading to an expensive control apparatus.

As compared therewith, the reflection-type photo-coupler is inexpensive and requires a very few number of parts.

If the reflection-type photo-couplet is used as an operation-detecting unit in a common apparatus, the light-receiving diode 9b of the reflection-type photo-coupler 9 would receive sun light when the apparatus is used outdoor, which may result in a malfunction. For this reason, the reflection-type photo-coupler has been considered unsuitable for an operation-detecting unit. However, the inventor of the present invention has discovered a fact that the reflection-type photo-coupler can be used as an operation-detecting unit by limiting its applications. Since the control apparatus of the present invention is used as mounted on or embedded in an armrest of a passenger plane or the like, it is necessarily used indoor and hence is free from any malfunction due to sun light.

The control apparatus shown in FIG. 7 has the liquid crystal panel 2 and the illumination plate 3. The illumination plate 3 receives visible light emitted from the light emitting diode 8 and scatters the light to illuminate the liquid crystal panel 2. To scatter light of the light emitting diode 8 toward the liquid crystal panel 2 as much as possible, the illumination plate 3 generally has a transparent surface facing the liquid crystal panel 2 and an opaque surface on the opposite side (the side facing the reflection-type photo-coupler). Accordingly, it has conventionally been considered difficult to insert the illumination plate 3 having an opaque surface into the optical path of an operation-detecting unit utilizing light.

Nevertheless, the inventor of the present invention has discovered a fact that infrared ray passes through the opaque surface of a common illumination plate 3. The opaque surface of the common illumination plate 3 reflects visible light but permits infrared ray to pass through. Thus, by using a photo-coupler having an infrared light emitting diode, such a photo-coupler is capable of detecting a user's finger even if the illumination plate 3 is inserted into the optical path of the photo-coupler. Furthermore, the liquid crystal panel used in the control apparatus having the photo-coupler 9 can be illuminated by the illumination plate 3.

The infrared light emitting device 9a and the light receiving device 9b are fixed in the package of the photo-coupler 9 so that the reflected light of the infrared light emitting device 9a is received by the light receiving device 9b only when the infrared ray is reflected at some definite distance just above the photo-coupler 9. And the distance between the surface of the face plate 6 and the photo-coupler 9 is designed to meet said definite distance.

When the control apparatus is mounted on an armrest of a seat in a passenger plane, the transparent cabinet face plate 6 exposed on the upper side of the armrest allows the liquid crystal panel 2 disposed inside of the cabinet face plate 6 to be indirectly seen therethrough and hence is inconspicuous relative to the armrest in terms of color. Thus, the control apparatus can be mounted on an armrest of any color without any incongruity in color, whereby there is no need to prepare a number of different color models of the control apparatus.

When the liquid crystal panel 2 in the control apparatus is driven, light from the light emitting diode 8 is received within the thickness of the illumination plate 3, and the operational indications 7 are displayed by the liquid crystal panel 2 receiving back-light from the illumination plate 3, whereby the user can see the displayed indications 7 through the cabinet face plate 6. Since the light of the light emitting diode 8 that is received within the thickness of the illumination plate 3 is distributed all over the illumination plate 3, fewer light emitting diodes will suffice to provide back-lighting covering a wider range at a substantially even-luminance.

In this way, the operational indications 7 of the liquid crystal panel 2 are displayed using light passing through the liquid crystal panel 2 from the inside. Accordingly, the control apparatus of the present invention ensures clear view of the indication even when the environment is dark and allows the user to operate it accurately even in a location where lighting may be lowered such as a passenger cabin of a passenger plane.

In detecting a contacting operation, the infrared light emitting diode 9a of each photo-coupler 9 emits infrared ray outside through the illumination plate 3, the liquid crystal panel 2 and the cabinet face plate 6. If a reflective object such as a user's finger is placed on the front side of the cabinet face plate 6, the infrared ray is reflected by the object and received by the light receiving diode 9b of the same photo-coupler 9. In this way, the contacting operation of the user is detected based on emission of infrared ray and reception of the reflected infrared ray.

In this case, since the photo-couplers 9 are driven at different timing from each other to perform detection, there is no possibility of interference caused by the infrared ray emitted from one photo-coupler 9 being received by another photo-coupler 9 and, hence, detection is accurate and reliable. In addition, the photo-couplers 9 can be arranged close to one another.

When a user's finger touches a portion of the cabinet face plate 6 in which any one of the operational indications 7 is located, the photo-coupler 9 located inside of that indication 7 detects the contact by the user's finger. In response to the detection, the control apparatus outputs an operation signal corresponding to the operational indication 7 thus selected.

While the cabinet 1 is entirely formed of a transparent resin in the above embodiment, the cabinet 1 can serve the purpose so long as the cabinet face plate 6 is transparent or translucent to such a degree as to permit light for contact detection to pass therethrough.

Furthermore, although the liquid crystal panel 2 is disposed inside of the cabinet face plate 6 to display the operational indications in the above embodiment, it is possible that the liquid crystal panel 2 is eliminated and the optical contact-detecting unit such as infrared photo-coupler 9 is disposed inside of the cabinet face plate 6 so as to face directly the face plate 6. In this case, it is recommended that the cabinet face plate 6 be made translucent and that the operational indications be directly printed on the cabinet plate 6 or be provided by affixing a sheet bearing such indications or the like to the cabinet plate 6.

It is also possible that the illumination plate 3 disposed inside of the liquid crystal panel 2 in the above embodiment is eliminated and that a light emitting body such as the light emitting diode 8 is disposed directly inside of the liquid crystal panel 2. In this case, the thickness of the operating section can be reduced by that of the illumination plate 3.

Furthermore, the optical contact-detecting unit is not limited to the reflection-type infrared photo-coupler used in the above embodiment but may comprise a device such as to detect a shadow of a finger caused by outside light.

The control apparatus of the above construction can be mounted on an armrest of a car seat or other vehicle seat, or on an armrest of a theater seat, as well as on an armrest of a seat of a passenger plane. A portion of a seat on which the control apparatus is to be mounted is not limited so long as the control apparatus can be mounted with the operating section exposed on that portion.

The control apparatus according to the present invention is imparted with a reliable and firm waterproofness against water or drink spilt thereon, to prevent a short circuit accident which may otherwise occur due to such liquid. Furthermore, the control apparatus suits an armrest of any color without incongruity in color. It is not necessary to prepare different color models of the control apparatus thereby reducing the manufacturing cost as a whole.

While the preferred embodiment of the present invention has been described in certain detail, it should be noted that the content of the disclosure of this preferred embodiment deserves to be changed or modified and a change in combination and order of elements can be made without departing from the scope and spirit of the invention defined by the following claims.

What is claimed is:

1. A control apparatus comprising:
   a cabinet on a face of which an operating section is formed which is operable by contact, at least a cabinet face plate forming part of said operating section comprising a light-transmitting plate covering all the other components of said operating section tightly and entirely;
   a liquid crystal panel disposed behind said cabinet face plate for displaying an operational indication; and
   an optical contact-detecting unit disposed behind said liquid crystal panel, the optical contact-detecting unit comprising a light emitting device and a light receiving device for detecting the contact with a surface of said cabinet through said liquid crystal panel.

2. The control apparatus according to claim 1, further comprising a lighting unit disposed between said liquid crystal panel and said optical contact-detecting unit.

3. The control apparatus according to claim 1, wherein said lighting unit comprises an illumination plate for receiving light from a light emitting body within the thickness thereof.

4. The control apparatus according to claim 1, wherein said optical contact-detecting unit is a reflection-type photo-coupler comprising an infrared light emitting device and a light receiving device.

5. The control apparatus according to claim 1, comprising a plurality of said optical contact-detecting units which perform detection at different timing from each other.

6. The control apparatus according to claim 1, wherein said face plate forming part of said cabinet and four lateral side plates adjoining to said face plate are formed into a unitary member which covers the control apparatus tightly and entirely.

* * * * *

UNITED STATES PATENT AND TRADEMARK OFFICE
CERTIFICATE OF CORRECTION

PATENT NO. : 6,661,478 B1  Page 1 of 1
DATED : December 9, 2003
INVENTOR(S) : Hiroshi Wakahara It is certified that error appears in the above-identified patent and that said Letters Patent is hereby corrected as shown below:

<u>Title page,</u>
Item [75], Inventor, please delete "Ikoma", and insert therefor -- Ikoma City --.
After *"Primary Examiner"* and *"Assistant Examiner"*, please insert
-- [74] *Attorney, Agent, or Firm* - Pearne & Gordon LLP --

Signed and Sealed this

Fourth Day of May, 2004

JON W. DUDAS
*Acting Director of the United States Patent and Trademark Office*

UNITED STATES PATENT AND TRADEMARK OFFICE
CERTIFICATE OF CORRECTION

PATENT NO.      : 6,661,478 B1
DATED           : December 9, 2003
INVENTOR(S)     : Hiroshi Wakahara It is certified that error appears in the above-identified patent and that said Letters Patent is hereby corrected as shown below:

<u>Column 8,</u>
Line 39, please delete "claim 1", and insert therfor -- claim 2 --.

Signed and Sealed this

Twentieth Day of July, 2004

JON W. DUDAS
*Acting Director of the United States Patent and Trademark Office*